(12) United States Patent
Wood

(10) Patent No.: US 12,342,012 B2
(45) Date of Patent: *Jun. 24, 2025

(54) INTELLIGENT DOWNLOAD OF CONTENT

(71) Applicant: Roku, Inc., San Jose, CA (US)

(72) Inventor: Anthony John Wood, Palo Alto, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,964

(22) Filed: May 3, 2024

(65) Prior Publication Data

US 2024/0292042 A1 Aug. 29, 2024

Related U.S. Application Data

(63) Continuation of application No. 18/182,705, filed on Mar. 13, 2023, now Pat. No. 12,015,810, which is a
(Continued)

(51) Int. Cl.
*H04N 21/2343* (2011.01)
*H04N 21/2387* (2011.01)
*H04N 21/239* (2011.01)
*H04N 21/442* (2011.01)
(Continued)

(52) U.S. Cl.
CPC ............... *H04N 21/234363* (2013.01); *H04N 21/23439* (2013.01); *H04N 21/2387* (2013.01);
(Continued)

(58) Field of Classification Search
CPC ..... H04N 21/234363; H04N 21/23439; H04N 21/2387; H04N 21/239; H04N 21/44209;
(Continued)

(56) References Cited

U.S. PATENT DOCUMENTS 9,246,965 B1 1/2016 Stoica et al.
11,317,127 B2 4/2022 Wood
(Continued)

FOREIGN PATENT DOCUMENTS

KR 10-2011-0072239 A 6/2011
KR 10-2015-0024084 A 3/2015
KR 10-2015-0032059 A 3/2015

OTHER PUBLICATIONS

Extended European Search Report directed to related European Application No. 18846746.8; mailed Dec. 22, 2020; 6 pages.
(Continued)

*Primary Examiner* — Nathan J Flynn
*Assistant Examiner* — Christine A Kurien
(74) *Attorney, Agent, or Firm* — Sterne, Kessler, Goldstein & Fox P.L.L.C.

(57) ABSTRACT

Intelligently downloading content to user devices is described herein. According to an embodiment, a user request for content is received. In response to the request, a low quality version of the content is downloaded and played to the user. Then, a higher quality version of the content is downloaded (this may occur during or after the download or playback of the low quality version of the content). Playback of the low quality version is discontinued. Then, playback of the higher quality version begins at the point where playback of the low quality version was discontinued. In some embodiments, the low quality version and the higher quality version of the requested content (among all the versions of the requested content) are identified via crowdsourcing.

20 Claims, 7 Drawing Sheets

Related U.S. Application Data continuation of application No. 17/692,854, filed on Mar. 11, 2022, now Pat. No. 11,638,046, which is a continuation of application No. 16/044,748, filed on Jul. 25, 2018, now Pat. No. 11,317,127.

(60) Provisional application No. 62/546,592, filed on Aug. 17, 2017.

(51) Int. Cl.
    *H04N 21/45*     (2011.01)
    *H04N 21/462*     (2011.01)
    *H04N 21/472*     (2011.01)
    *H04N 21/647*     (2011.01)

(52) U.S. Cl.
    CPC ..... *H04N 21/239* (2013.01); *H04N 21/44209* (2013.01); *H04N 21/4524* (2013.01); *H04N 21/4621* (2013.01); *H04N 21/472* (2013.01); *H04N 21/647* (2013.01)

(58) Field of Classification Search
    CPC ........... H04N 21/4524; H04N 21/4621; H04N 21/472; H04N 21/647; H04N 21/2662; H04N 21/4384
    See application file for complete search history.

(56) References Cited

U.S. PATENT DOCUMENTS

| | | |
|---|---|---|
| 11,638,046 B2 | 4/2023 | Wood |
| 2002/0059642 A1* | 5/2002 | Russ ............... H04N 21/434 348/E5.103 |
| 2007/0209005 A1* | 9/2007 | Shaver .............. G06F 16/958 707/E17.116 |
| 2009/0328124 A1* | 12/2009 | Khouzam ........ H04N 21/6377 725/116 |
| 2010/0169414 A1 | 7/2010 | Pavot et al. |
| 2011/0046755 A1 | 2/2011 | Sung et al. |
| 2013/0263179 A1 | 10/2013 | Dow et al. |
| 2014/0310424 A1 | 10/2014 | Anderson et al. |
| 2015/0372927 A1 | 12/2015 | Lv |
| 2016/0192296 A1 | 6/2016 | Rehan et al. |
| 2016/0381421 A1 | 12/2016 | Inayatullah et al. |
| 2017/0078735 A1 | 3/2017 | Greene |
| 2019/0058906 A1 | 2/2019 | Wood |
| 2022/0201348 A1 | 6/2022 | Wood |
| 2023/0217049 A1 | 7/2023 | Wood |

OTHER PUBLICATIONS

International Search Report and Written Opinion of the International Searching Authority directed to related International Patent Application No. PCT/US2018/000262, mailed Dec. 24, 2018; 11 pages.

English-language Abstract of Korean Patent Application Publication No. KR 10-2011-0072239 A; 1 page.

English-language Abstract of Korean Patent Application Publication No. KR 10-2015-0024084 A; 1 page.

English-language Abstract of Korean Patent Application Publication No. KR 10-2015-0032059 A; 1 page.

\* cited by examiner

INTELLIGENT DOWNLOAD OF CONTENT

CROSS-REFERENCE TO RELATED APPLICATIONS

This application is a continuation of U.S. patent application Ser. No. 18/182,705, filed Mar. 13, 2023, now allowed, which is a continuation of U.S. patent application Ser. No. 17/692,854, filed Mar. 11, 2022, now U.S. Pat. No. 11,638,046, which is a continuation of U.S. patent application Ser. No. 16/044,748, filed Jul. 25, 2018, now U.S. Pat. No. 11,317,127, which claims the benefit of provisional U.S. Patent Application No. 62/546,592, titled "Intelligent Download of Content" filed on Aug. 17, 2017, each of which are incorporated herein by reference in their entirety.

FIELD

This disclosure is generally directed to the download of content from content sources to user devices.

BACKGROUND

In today's world, on-demand availability of content—such as movies, TV shows and music, to name just a few examples—is commonplace. But the download of content from content sources to a user's device is often a challenge. For example, depending on the speed of available connections, the download of high definition content to a user's device could be measured in hours, rather than minutes.

Such lengthy download times negatively impact user enjoyment of content. Also, a user may find even shorter download times to be undesirable, depending on when the user wishes to playback the content, or how long the user has to playback the content.

SUMMARY

Provided herein are system, apparatus, article of manufacture, method and/or computer program product embodiments, and/or combinations and sub-combinations thereof, for intelligently downloading content to user devices.

In some embodiments, a user request for content is received. In response to the request, a low quality version of the content is downloaded and played to the user. Then, a higher quality version of the content is downloaded (this may occur during or after the download or playback of the low quality version of the content). Playback of the low quality version is discontinued. Then, playback of the higher quality version begins at the point where playback of the low quality version was discontinued. In some embodiments, the low and higher quality versions of the content (among all the versions of the content) are identified via crowdsourcing.

In other embodiments, a user request for content is received. In response to the request, a quality of the requested content to download is determined. Such determination may be based on, for example, at least one of (a) when the user intends to play the requested content, and (b) the amount of time the user has set aside to play the requested content. Or, the determination may be based on the amount of time the user has to download the content. Then, a version of the requested content corresponding to the determined quality is downloaded and played on a user device.

In still other embodiments, a user request for content is received. In response to the request, an IP address of an available wireless connection is determined. A crowdsource server is accessed to identify a version of the requested content to download using the IP address, wherein the identified version of the content was previously reported to the crowdsource server (by users and/or user devices) as having been successfully downloaded in the past using the IP address. This crowdsource-identified version of the content is downloaded and played to the user.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
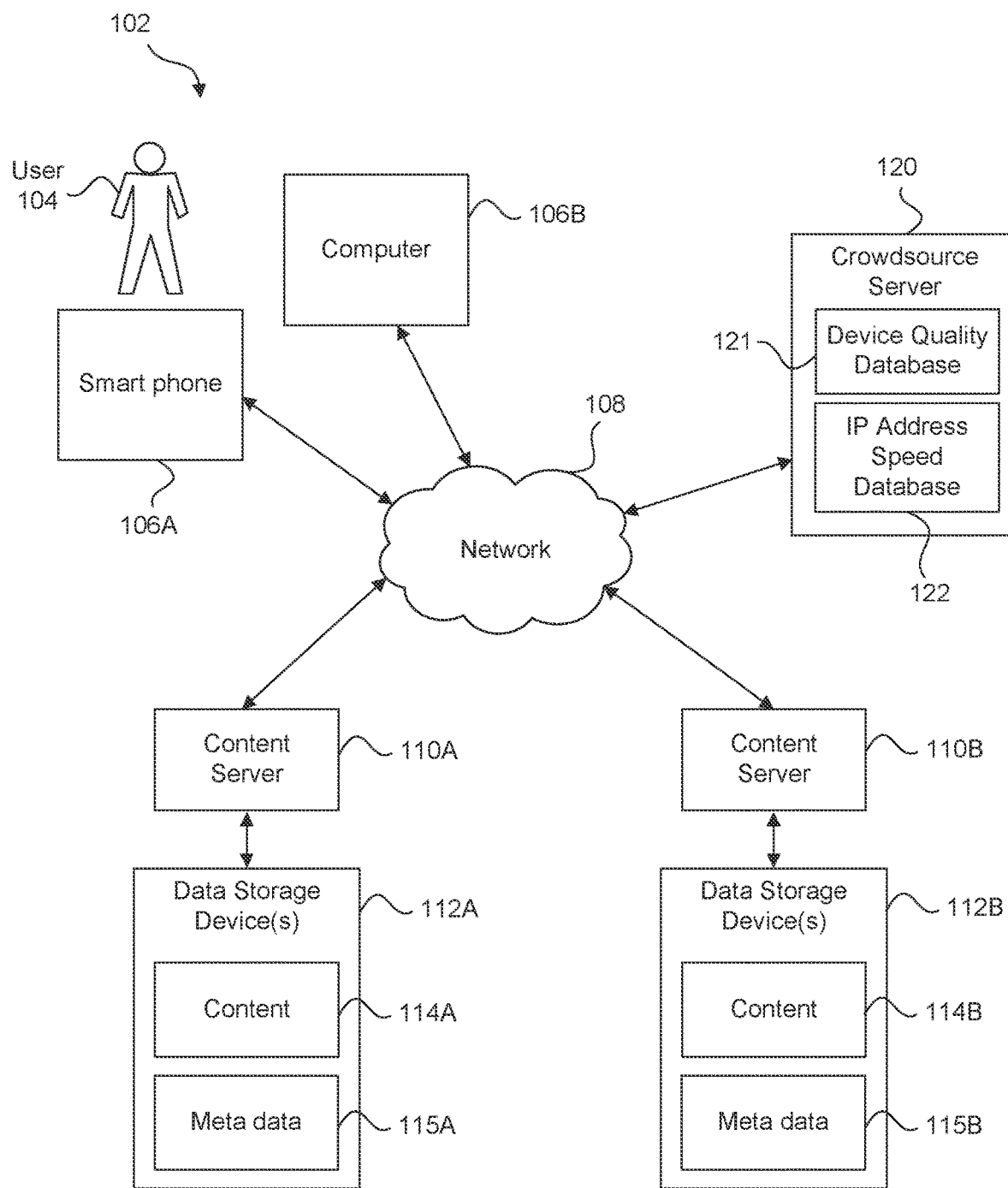
FIG. 1 illustrates an example environment where a user downloads content from content servers to one or more user devices (such as a smartphone or a computer), according to some embodiments.

FIG. 1 illustrates an example environment 102 where a user 104 may download content from one or more content servers 110 to one or more user devices 106, according to some embodiments. The example of FIG. 1 shows two content servers 110A, 110B, although in other embodiments the environment 102 may include any number of content servers 110. Also, FIG. 1 shows user devices 106 as including a smartphone 106 and/or a computer 106, although in other embodiments user devices 106 may be any device or application configured to download and display content, such as a monitor, television, tablet, watch or other smart wearable, projector, streaming media device, DVD device, audio/video playback device, cable box, and/or digital video recording device, to name just a few examples, as well as combinations thereof.

Content servers 110 (also called content sources) may each include or be connected to one or more data storage devices 112 or databases to store content 114 and metadata 115. Content 114 may include any combination of music, videos, movies, TV programs, multimedia, images, still pictures, text, graphics, gaming applications, advertisements, software, and/or any other content or data objects in electronic form. Metadata 115 may comprise data about content 114. For example, metadata 115 may include associated or ancillary information indicating or related to writer, director, producer, composer, artist, actor, summary, chapters, production, history, year, trailers, alternate versions, related content, applications, and/or any other information pertaining or relating to the content 114. Metadata 115 may also or alternatively include links to any such information pertaining or relating to the content 114. Metadata 115 may also or alternatively include one or more indexes of content 114, such as but not limited to a trick mode index.

In some embodiments, content 114 may include different versions of the same content, where the versions are of different video and/or audio qualities. For example, content 114 may store different versions of a given movie or television program, where the versions have different display resolutions. In some embodiments, for a given movie or television program, content 114 may store versions having any of the display resolutions listed in Table 1. It will be appreciated by persons skilled in the relevant art(s) that this disclosure is not limited to the example display resolutions shown in Table 1, but is instead applicable to any display resolutions existing now or developed in the future.

TABLE 1

Example Display Resolutions

| Standard | Aspect ratio | Width (pixels) | Height (pixels) |
| --- | --- | --- | --- |
| XGA+ | 4:3 | 1152 | 864 |
| XGA | 4:3 | 1024 | 768 |
| WXGA+ | 16:10 | 1440 | 900 |
| WXGA | 16:9 | 1280 | 720 |
| WXGA | 5:3 | 1280 | 768 |
| WXGA | 16:10 | 1280 | 800 |
| WUXGA | 16:10 | 1920 | 1200 |
| WSXGA+ | 16:10 | 1680 | 1050 |
| WSVGA | ~17:10 | 1024 | 600 |
| WQXGA | 16:10 | 2560 | 1600 |
| WQHD | 16:9 | 2560 | 1440 |
| VGA | 4:3 | 640 | 480 |
| UXGA | 4:3 | 1600 | 1200 |
| SXGA | 5:4 | 1280 | 1024 |
| SVGA | 4:3 | 800 | 600 |
| HD+ | 16:9 | 1600 | 900 |
| HD | ~16:9 | 1360 | 768 |
| FHD | 16:9 | 1920 | 1080 |
| CGA | 4:3 | 320 | 240 |
| 4K UHD | 16:9 | 3840 | 2160 |
| 8K UHD | 16:9 | 7680 | 4320 |

As will be appreciated by persons skilled in the relevant art(s), and as apparent by Table 1, a given display resolution may be lower quality than some display resolutions, and higher quality than other display resolutions. For example, FHD is higher resolution than HD and VGA (as well as others), but lower resolution than 4K and 8K (as well as others). As also will be appreciated by persons skilled in the relevant art(s), higher resolution content requires more storage and takes longer to download than lower resolution content.

While Table 1 illustrates different display resolutions, this disclosure is not so limited. For example, in some embodiments, content 114 may include multiple versions of movies, TV programs, music, etc., of different audio quality (rather than display quality). Content 114 may also include different versions of books (abridged and unabridged, for example), different versions of software (trial versus full featured, for example), etc. As will be appreciated by persons skilled in the relevant art(s), such different versions trade off quality for storage size. That is, higher quality versions require more storage (and take longer to download) than lower quality versions.

Content servers 110 may be communicatively coupled to user devices 106 via a network 108. In various embodiments, the network 108 may include, without limitation, wired and/or wireless intranet, extranet, Internet, cellular, Bluetooth and/or any other short range, long range, local, regional, global communications network, as well as any combination thereof.

In some embodiments, environment 102 may include one or more crowdsource servers 120. Crowdsource server(s) 120 may communication with user device(s) 106 and/or content server(s) 110 via network 108.

Figure 2:
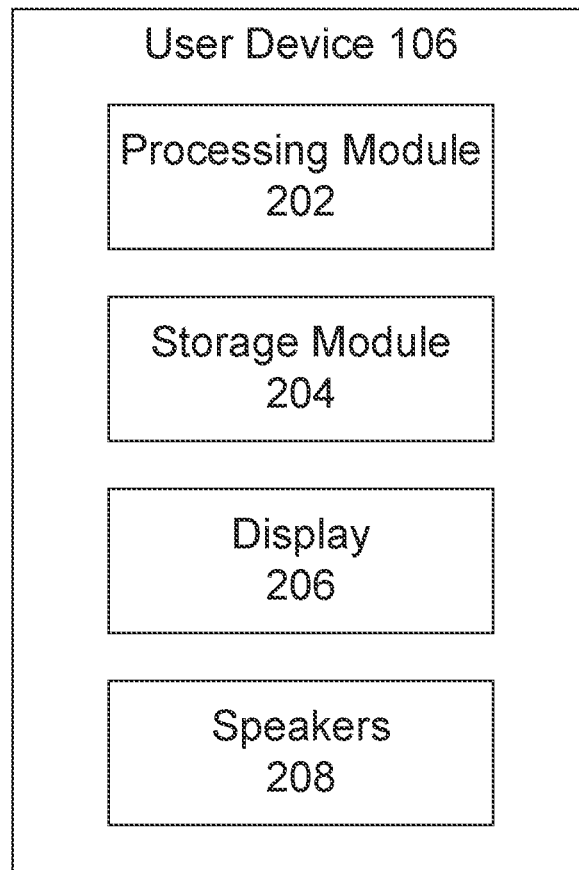
FIG. 2 illustrates a block diagram of a user device, according to some embodiments.

FIG. 2 illustrates an example block diagram of a user device 106, according to some embodiments. User device 106 may include a processing module 202, storage module 204, display 206 and speakers 208, as well as a physical and/or wireless connection for earphones (not shown).

Referring now to both FIGS. 1 and 2, user 112 may interact with user device 106 (i.e., the smartphone 106A or computer 106B, for example) to select and download content for playback. The processing module 202 of the user device 106 may request the content from content server(s) 110. In response, content server(s) 110 may provide the requested content 114 to the user device 106. The user device 106 may buffer or store the received content 114 in storage module 204, and playback the content 114 to the user 104 via the display 206 and speakers 208.

However, the content 114 may take significant time to download to user device 106, depending on the version of the content 114 that is being downloaded (as well as other factors, such as the speed of the connection between the user device 106 and the content server 110 via network 108). For example, user 114 may usually prefer to download a higher quality version of the content 114. But, in some situations, user 114 may have limited time for the download. For example, user 114 may be about to board a plane, or may wish to play the content 114 during his lunch hour. Thus, it may be preferable to download a lower quality version rather than a higher quality version in these situations.

Accordingly, provided herein are system, apparatus, article of manufacture, method and/or computer program product embodiments, and/or combinations and sub-combinations thereof, for downloading content, wherein the version of the content (and correspondingly, the quality level of the content) to be downloaded is automatically and intelligently determined.

Figure 3:
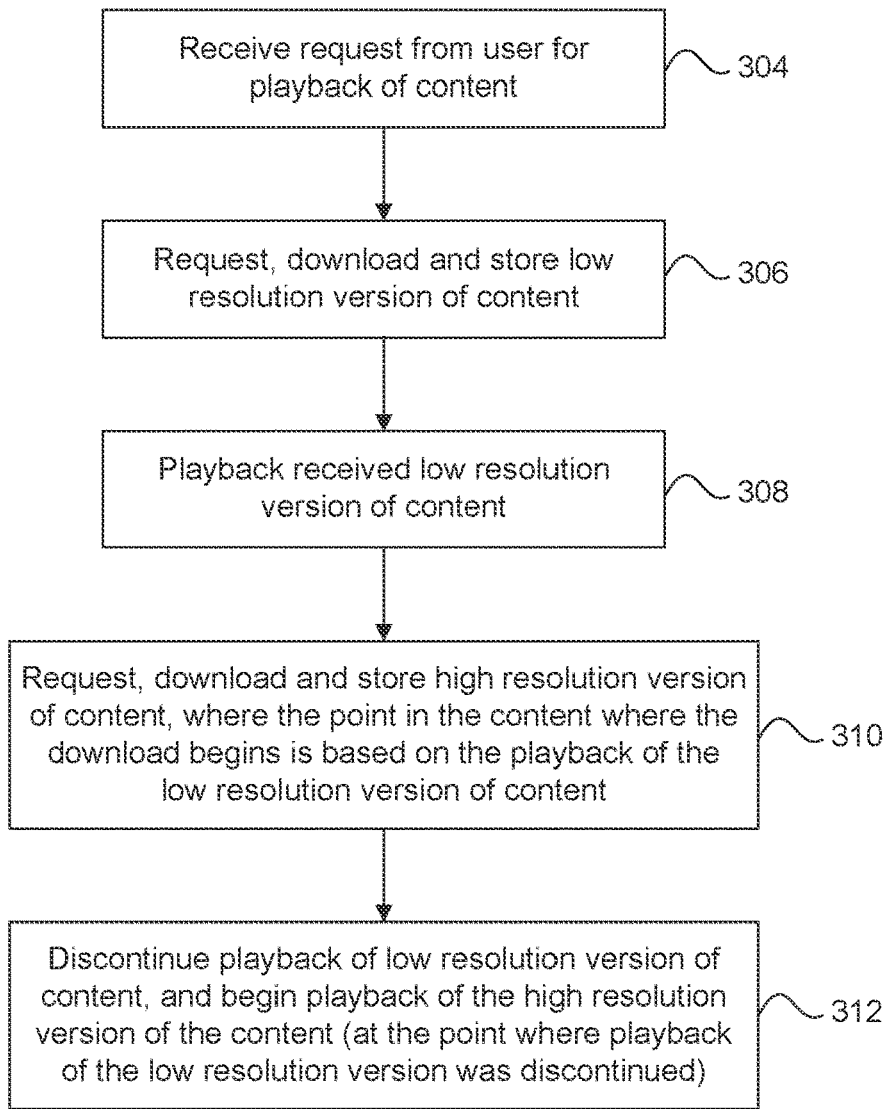
FIG. 3 illustrates a flowchart for downloading and playing content on a user device, where a low resolution version of the content is downloaded prior to the download of a high resolution version of the content, according to some embodiments.

FIG. 3 illustrates a method 302 for downloading and playing content on a user device, where a lower resolution version of the content is downloaded prior to the download of a higher resolution version of the content, according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 302 shall be described with reference to FIGS. 1 and 2. However, method 302 is not limited to that example embodiment.

In 304, the user device 106 (such as the smartphone 106A and/or the computer 106B, for example) may receive a request from the user 104 for the playback of content.

In 306, the user device 106 may request the content from the content server(s) 110. In some embodiments, the user device 106 may request a relatively low quality version of the content. For example, if the requested content is a movie or TV program, the user device 106 may request the version of the content that is available from the content servers 110 and that has the lowest display resolution. Alternatively, the user device 106 may request the lowest quality version that is still deemed acceptable for playback on the user 104's particular user device 106, given the playback capabilities of the user device 106 (such as screen size, display resolution, audio quality, etc.), as indicated by crowdsourced data stored, for example, in a device quality database 121 of crowdsource server 120.

The device quality database 121 can be populated in many ways. For examples, users may provide solicited or unsolicited feedback regarding the lowest quality level of content they subjectively deem acceptable for playback on their particular user devices. Users may also provide solicited or unsolicited feedback regarding the highest quality level of content they subjectively deem useful for playback on their particular user devices. Such feedback may be provided directly or indirectly to the crowdsource server 120. Additionally or alternatively, user devices 106 may automatically provide data to the crowdsource server 120, indicating the lowest and the highest quality versions of a given content that have been played on such user devices 106. The crowdsource server 120 may use such information to generate scores for user devices. For example, for a given brand/model of a user device, crowdsource server 120 may generate a score for a given quality level by adding the positive responses and subtracting the negative responses. The quality level having the highest score would be used in step 306.

The user device 106, in 306, may receive the requested content 114 from content server(s) 110, along with any meta data 115. Because a lower quality version of the content is requested in step 306, such content can be downloaded to the user device 106 in a relatively shorter period of time (compared to downloading higher quality versions of the content). The user device 106, in 306, may store the received content 114 and meta data 115 in the storage module 204.

In 308, the user device 106 may playback the received content 114 using display 206 and speakers 208 (or earphones, not shown in FIG. 2).

In 310, the user device 106 may request a higher quality version of the content from the content server(s) 110. Step 310 may be performed during, or after, step 306, depending on a number of factors, such as the connection speed of the user device 106, how much time the user 104 has to download the content, how much time the user 104 has to playback the content, etc. For example, if the user 104 was about to board a plane while the lower quality version of the content was being downloaded in step 306, then it may not be possible to download the higher quality version in step 310 until the plane lands and suitable connectivity is restored to the network 108. In some embodiments, user device 106 may determine when to perform step 310 by accessing the user 104's calendar or location, as shall be described in greater detail below with reference to FIG. 5.

In some embodiments, if the requested content is a movie or TV program, the user device 106 may request the version available from the content servers 110 that has the highest display resolution. Alternatively, the user device 106 may request the highest quality version that is deemed useful for playback given the playback capabilities of the user device 106 (such as screen size, display resolution, audio quality, etc.), as indicated by crowdsourced data stored, for example, in the device quality database 121 of the crowdsource server 120 (population of the device quality database 121 was discussed above).

In some embodiments, user device 106 in 310 may download the higher quality content from content server(s) 110 beginning at a point in the content corresponding to the furthest point in the content that has been played back to the user 104 in step 308. For example, if the content is a movie, and chapter 2 has been played back to user 104 at the time step 310 commences, then in step 310 the user device 106 may download the higher quality content beginning at or after chapter 3. In other embodiments, user device 106 may download the entire higher quality version of the content, to enable the user 104 to play the content from the beginning and/or perform rewind operations.

The user device 106, in 310, may receive and store the higher quality version of the content 114 in the storage module 204.

In 312, the user device 106 may discontinue playback of the lower quality version of the content (that was downloaded in step 306), and may begin playback of the higher quality version of the content (that was downloaded in step 310). In some embodiments, the playback of the higher quality version in 312 begins at the furthest point in the content that has been played back to the user 104 in step 308.

Accordingly, flowchart 302 enables a relatively fast, initial download of a lower quality version of content. Thereafter, a higher quality version of the content is downloaded. In this manner, the user 104 is able to quickly enjoy on-demand content even when network connectivity or time scheduling is not optimal, while also enjoying a higher quality version of the content for playback when conditions permit.

Figure 4:
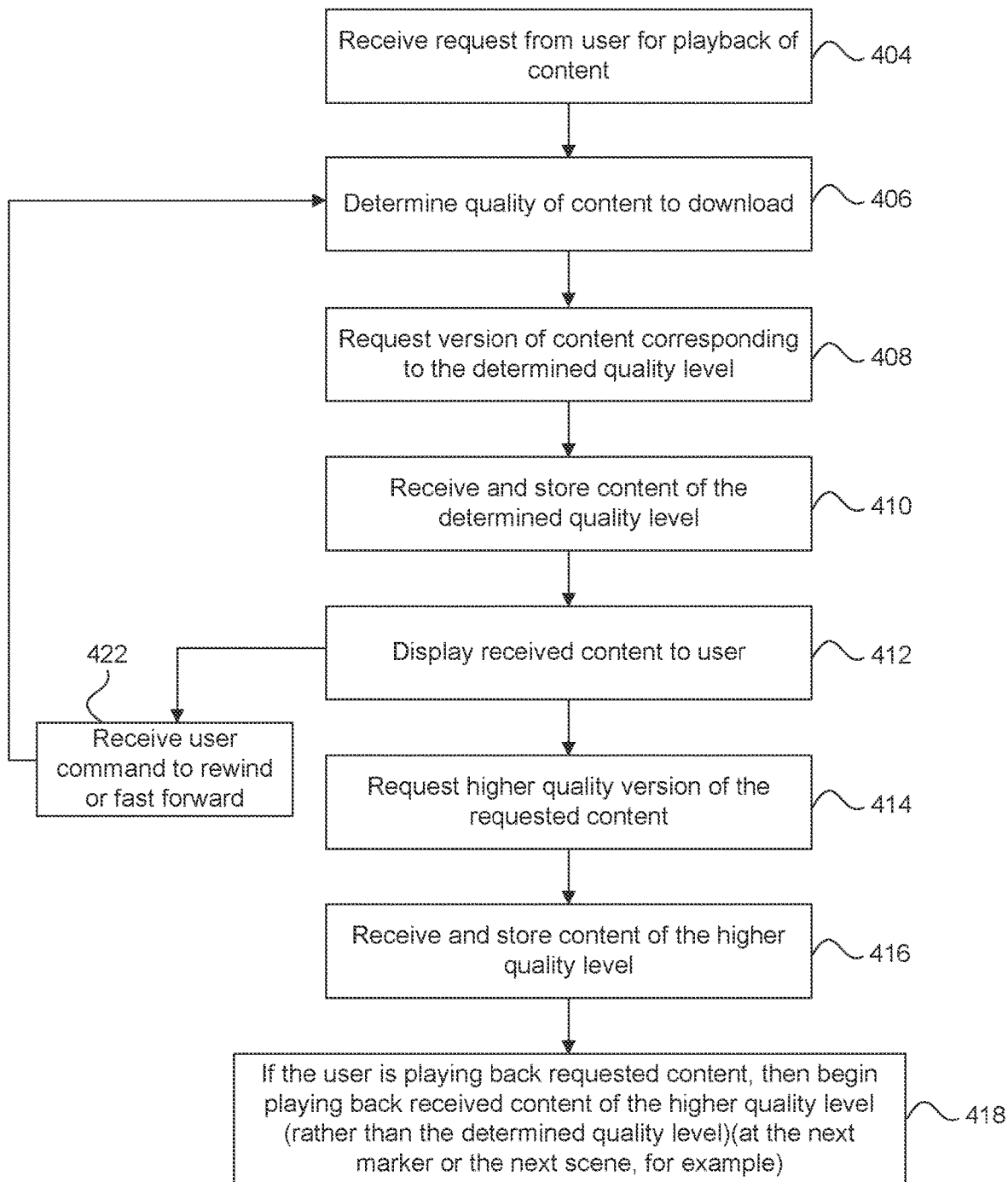
FIGS. 4 and 5 collectively illustrate a flowchart for downloading and playing content on a user device, where the version of the content that is downloaded is intelligently determined, according to some embodiments.
Figure 5:
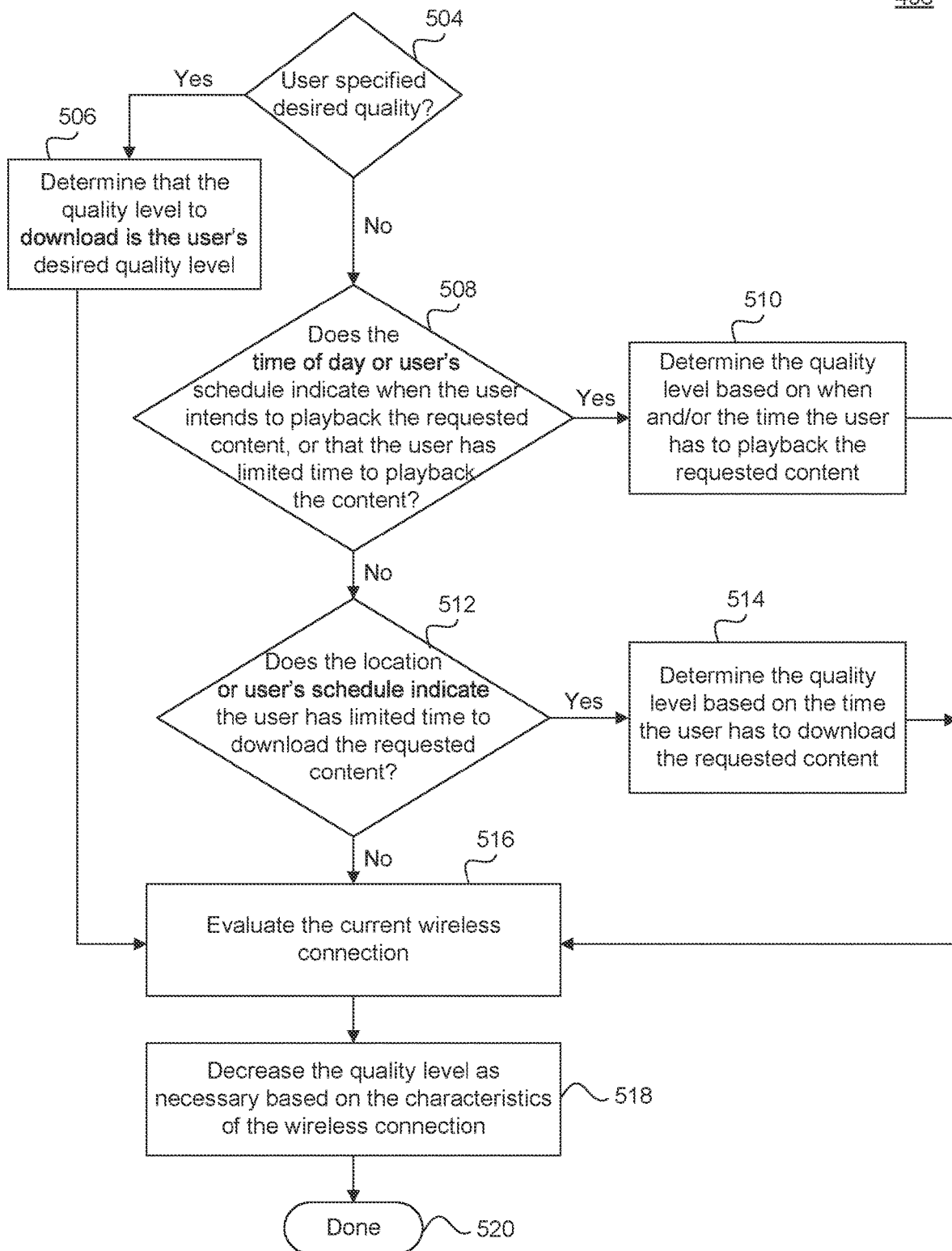

FIGS. 4 and 5 collectively illustrate a method 402 for downloading and playing content on a user device, where the version of the content that is downloaded is intelligently determined, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 402 shall be described with reference to FIGS. 1 and 2. However, method 402 is not limited to that example embodiment.

Referring first to FIG. 4, in 404, the user device 106 (such as the smartphone 106A and/or the computer 106B, for example) may receive a request from the user 104 for the playback of content.

In 406, the user device 106 may determine the version, or the quality, of the requested content to download.

Referring now to FIG. 5, an example implementation of step 406 is shown, according to some embodiments.

In 504, the user device 106 may determine if the user 104 specified a desired quality level for download. For example, the user 104 may have specified a desired quality level in the request received in step 404, or in user preference settings. For example, if the content is a movie, the user 104 may have requested FHD (full high definition).

If the user 104 specified a desired quality level, then step 506 is performed. In 506, the user device 106 determines that the quality level to download is the user 104's desired quality level. Step 516 is then performed, which is described below.

If the user 104 did not specify a desired quality level, then step 508 is performed. In 508, the user device 106 may determine if the time of day or the user 104's schedule indicates when the user 104 intends to playback the content, or that the user 104 has limited time to playback the content. For example, the user 104's calendar may have a "watch movie" entry, indicating that the user 104 intends to watch the requested movie during that time slot. As another example, the user 104's calendar may indicate the user 104 is about to go to lunch that is scheduled for 1 hour, or the "watch movie" entry may be of short duration. These factors may indicate that the user 104 has limited time to playback the requested content.

If it is determined that the time of day or the user 104's schedule indicates when the user 104 intends to playback the content, or that the user 104 has limited time to playback the content, then step 510 is performed. Otherwise step 512 is performed.

In 510, the user device 106 may determine the version, or the quality, of the requested content to download based on when the user 104 intends to playback the content, or the amount of time the user has set aside to playback the content. For example, the user device 106 may select the version of the content based on whether such version can be downloaded to the user device 106 prior to when the user intends to playback the content. That is, in some embodiments, the user device 106 will select the version of highest quality that can be downloaded prior to when the user 104 intends to playback the content.

Also or alternatively in 510, the user device 106 may select the version of the content based on how long the user 104 has set aside to playback the content. For example, if the user 106 has set aside the entire day to watch a movie, then the user device 106 may select a higher quality version to download, even though the download process may consume some part of the period the user 104 has set aside to watch the movie. In contrast, if the user 104 has set aside only an hour to watch the movie, then the user device 106 may select a lower quality version to download, to better ensure the movie has been downloaded and available for playback when desired by the user 104, and also to better ensure the download process does not take any of the short period of time the user 104 has set aside to playback the content.

In 512, the user device 106 may determine if the user's location or schedule indicates that the user 104 has limited time to download the requested content. For example, the user device 106 may access the user 104's calendar (that may be stored in user device 106 or available via network 108) and determine that the user is about to board a plane or otherwise lose suitable connectivity to network 108. These factors may indicate that the user 104 has limited time to download the requested content (that is, the content must be downloaded while there is suitable connectivity to network 108).

The user device 106 may also reach this determination by determining the user's location (using GPS or other location service features within user device 106 or available via the network 108). For example, user device 106 may determine that the user 106 is in an airport and therefore conclude the user 104 is likely about to board a plane.

If it is determined that the user's location or schedule indicates that the user 104 has limited time to download the requested content, then step 514 is performed. Otherwise step 516 is performed.

In 514, the user device 106 may determine the version, or the quality, of the requested content to download based on the amount of time the user 104 has to download the content. For example, if the user 104's schedule indicates the user 104's plane is taking off in one hour, or otherwise indicates the user 104 will likely lose suitable connectivity to network 108 in one hour, then the user device 106 may select a version of the content that can be downloaded in one hour.

In 516, the user device 106 may evaluate and determine the conditions of the user device 106's connection to the network. Such conditions include speed, robustness, signal level, etc. In 518, based on the evaluation and determination of step 516, the user device 106 may decrease the quality level (determined in 506, 510 or 514). For example, if the content is a movie, and the quality level was determined in 506, 510 or 514 to be FHD, then in 518 the user device 106 may reduce the quality level to HD if the conditions of the network connection are not sufficient to support the download of FHD content.

It is noted that steps 516 and 518 are optional and not performed in some embodiments.

Returning now to FIG. 4, in 408, the user device 106 may request from the content server(s) 110 the version of the content corresponding to the quality level determined in step 406.

In 410, the user device 106 may receive and store the requested content 114 in the storage module 204.

In 412, the user device 106 may playback the content 114 to the user 104 using the display 206 and speakers 208 (or earphones, not shown).

In 422, the user device 106 may receive a command from user 104 to rewind, fast forward or otherwise seek through the content being played back. In some embodiments, after performing the seek operation, the user device 106 may continue to playback the content 114 using the version stored in the storage module 204. In other embodiments, particularly if the user device 106 is connected to the network 108, control may instead return to step 406 to determine the quality of the content to download from content server(s) 110 to playback the content after performing the seek operation.

In steps 414, 416 and 418, the user device 106 may request, download and playback a version of the content of higher quality than that determined in step 406. The operation of steps 414, 416 and 418 is similar to the operation of steps 310 and 312, described above.

Figure 6:
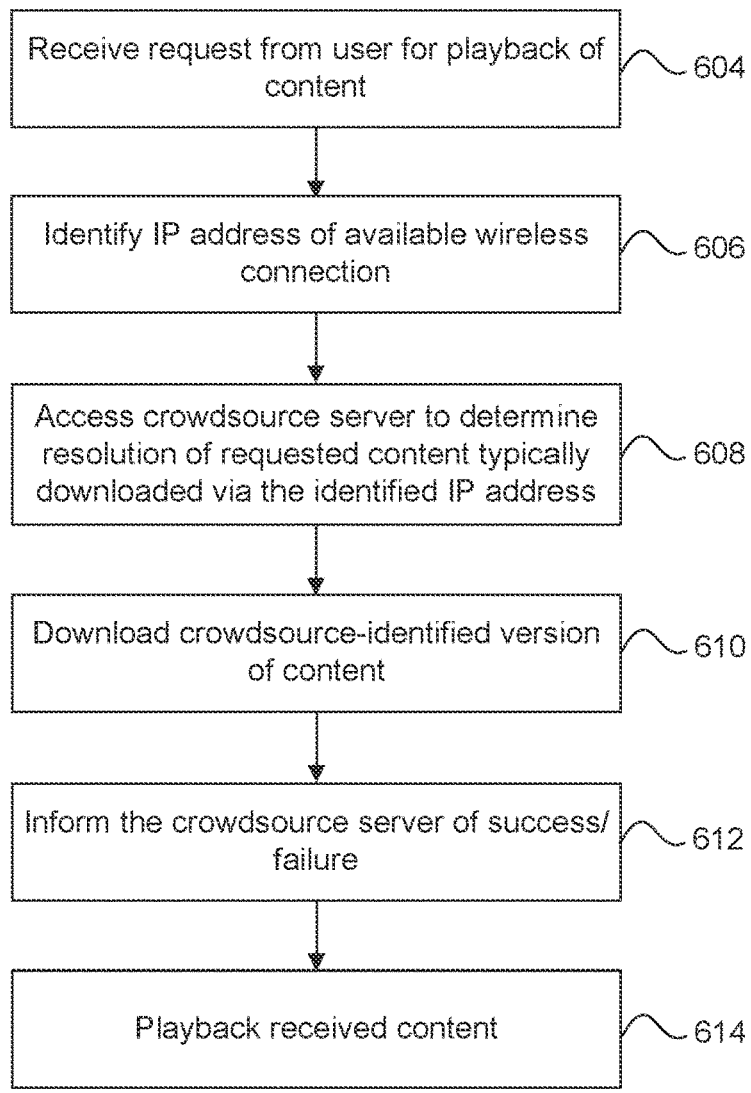
FIG. 6 illustrates a flowchart for downloading and playing content on a user device, where the version of the content that is downloaded depends on the IP address being used and is determined in a crowdsourced manner, according to some embodiments.

FIG. 6 illustrates a method 602 for downloading and playing content on a user device, where the version of the content that is downloaded is determined in a crowdsourced manner, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 602 shall be described with reference to FIGS. 1 and 2. However, method 602 is not limited to that example embodiment.

In 604, the user device 106 (such as the smartphone 106A and/or the computer 106B, for example) may receive a request from the user 104 for the playback of content.

In 606, the user device 106 may identify the IP (internet protocol) addresses of wireless connections that are available to the user device 106. Also in 606, the user device 106 may evaluate and determine the conditions of such wireless connections. Such conditions may include, for example, speed, robustness, signal level, etc. The user device 106 in 606 may select the wireless connection having the greatest combination of speed, robustness, signal level, etc.

Referring to FIG. 1, in some embodiments, the crowdsource server 120 may maintain an IP address speed database 122. The IP address speed database 122 may include crowdsourced data indicating the version of a given content that is typically successfully downloaded using a network connection associated with a given IP address. The IP address speed database 122 may include such information for all content and all IP addresses for which it has received crowdsourced data.

Accordingly, in 608, the user device 106 may access the crowdsource server 120 to determine the version of the requested content that is typically successfully downloaded over the selected IP address.

In 610, the user device 106 may download from the content server(s) 110, using the wireless connection corresponding to the selected IP address, the crowdsource-identified version of the requested content as indicated by the crowdsource server 120 in step 608.

In 612, the user device 106 may transmit a message to the crowdsource server 120 to indicate whether the download using the selected IP address was successful or unsuccessful. In some embodiments, the crowdsource server 120 may use this information to update, as appropriate, its record in the IP address speed database 122 identifying the version of the content that is typically successfully downloaded using the selected IP address. For example, if the crowdsource-identified version is currently HD, and the download of the HD version in step 610 was unsuccessful, the crowdsource server 120 may reduce a score associated with the HD version by some amount (such as decrementing the score by 1, for example) such that the VGA version of the content over the selected IP address then has the highest score. Thereafter, in future performance of step 608, the crowdsource server 120 may return VGA as the crowdsource-identified version of the requested content for the selected IP address.

In some embodiments, if the download is unsuccessful in step 610, the user device 106 may attempt to download using the selected IP address a version of the content that is lower in quality than that identified by the crowdsource server 120 in step 608. For example, the user device 106 may attempt to download using the selected IP address the version of the content that is next highest in quality. The user device 106 may continue to try to download using the selected IP address versions of the content that are progressively lower in quality. For each attempt, the user device 106 may transmit the crowdsource server 120 a message over network 108, to inform the crowdsource server 120 of either a successful or unsuccessful download of the particular version of the content over the selected IP address. The crowdsource server 120 may use this information to update, as appropriate, its record in the IP address speed database 122 identifying the version of the content that is typically successfully downloaded using the selected IP address, as described above.

In 614, the user device 106 may play the content 114 to the user 104 using the display 206 and speakers 208.

Although not shown in FIG. 6, the user device 106 may thereafter attempt to download and playback a higher quality version of the requested content. Such operation is similar to steps 310 and 312 of FIG. 3, described above.

Example Computer System

Figure 7:
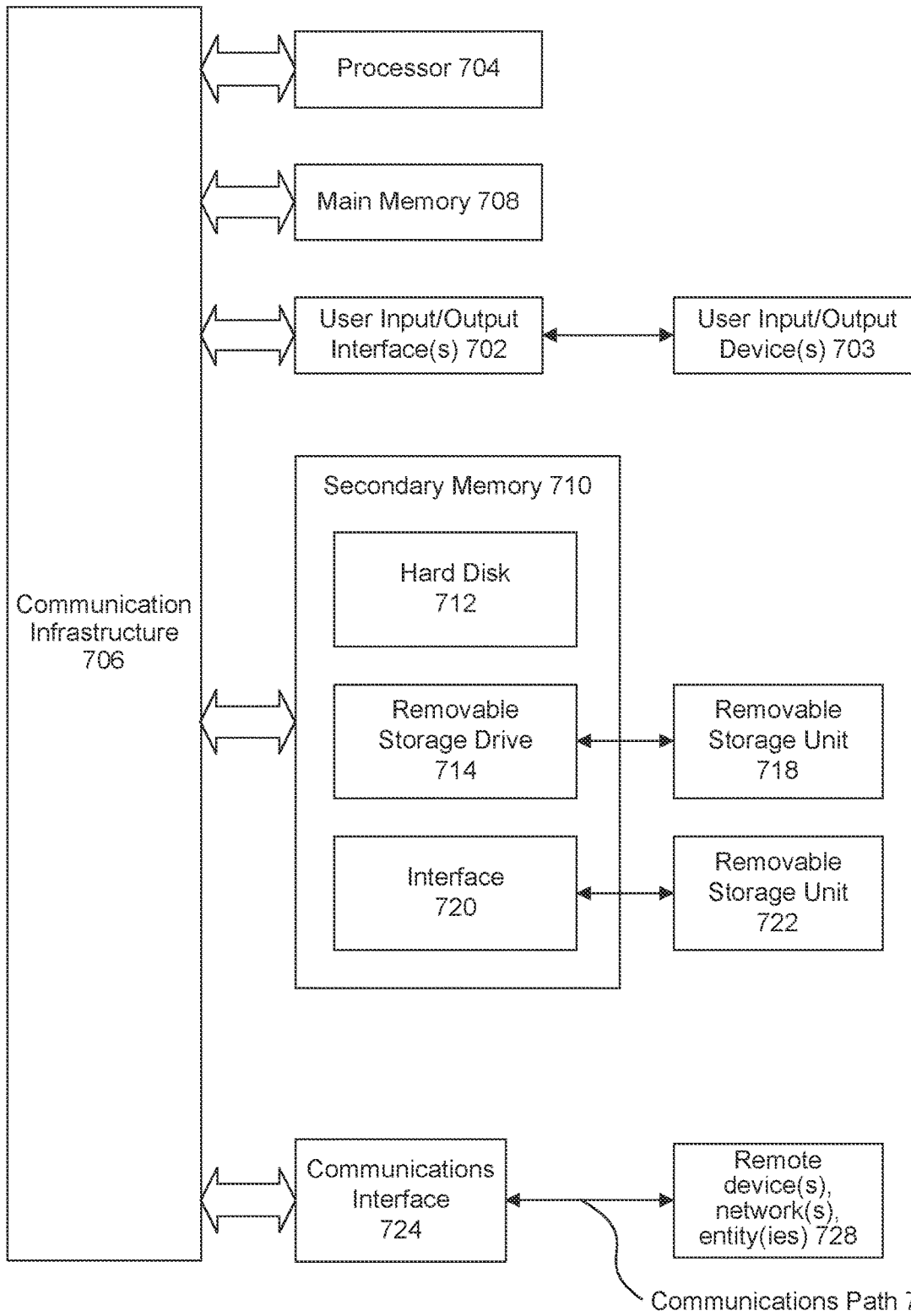
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, one or more computer systems 700 can be used to implement any embodiments of FIGS. 1-6, and/or any combination or sub-combination thereof.

Computer system 700 includes one or more processors (also called central processing units, or CPUs), such as a processor 704. Processor 704 is connected to a communication infrastructure or bus 706.

One or more processors 704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for intelligently downloading content, comprising:
   receiving a request for the content from a user;
   downloading a first quality version of the content from a content server in response to the receiving the request;
   playing, by at least one computer processor, the first quality version of the content on a user device;
   in response to the playing, determining a second quality version of the content among a plurality of quality versions of the content to download based on a future time slot when the user intends to playback the content, wherein a resolution of the second quality version of the content is lower than a resolution of the first quality version of the content;
   in response to the determining, requesting the second quality version of the content;
   downloading the second quality version of the content in response to the requesting the second quality version of the content;
   discontinuing the downloading of the first quality version of the content based on the downloading of the second quality version of the content; and
   playing the second quality version of the content on the user device at a point in the content where the downloading of the first quality version of the content was discontinued.

2. The computer implemented method of claim 1, wherein the downloading the second quality version of the content further comprises:
   downloading the second quality version of the content based on a furthest point in the content that has been played to the user.

3. The computer implemented method of claim 1, wherein the requesting the second quality version of the content further comprises:
   selecting the second quality version of the content to download based on crowdsourced data specifying a highest quality version of the content that is acceptable given playback capabilities of the user device.

4. The computer implemented method of claim 1, wherein the downloading the second quality version of the content further comprises:
   downloading the second quality version of the content based on a location of the user device.

5. The computer implemented method of claim 1, wherein the determining the second quality version of the content among the plurality of quality versions of the content to download further comprises:

determining the second quality version of the content among the plurality of quality versions of the content to download based on an amount of time the user has to download the content.

6. The computer implemented method of claim 5, wherein the amount of time the user has set aside to playback the content is determined based on a calendar for the user.

7. The computer implemented method of claim 5, wherein the amount of time the user has set aside to playback the content is determined based on a location of the user device.

8. A user device, comprising:
one or more memories; and
at least one processor each coupled to at least one of the memories and configured to perform operations comprising:
receiving a request for content from a user;
downloading a first quality version of the content from a content server in response to the receiving the request;
playing the first quality version of the content on the user device;
in response to the playing, determining a second quality version of the content among a plurality of quality versions of the content to download based on a future time slot when the user intends to playback the content, wherein a resolution of the second quality version of the content is lower than a resolution of the first quality version of the content;
in response to the determining, requesting the second quality version of the content;
downloading the second quality version of the content in response to the requesting the second quality version of the content;
discontinuing the downloading of the first quality version of the content based on the downloading of the second quality version of the content; and
playing the second quality version of the content on the user device at a point in the content where the downloading of the first quality version of the content was discontinued.

9. The user device of claim 8, wherein the downloading the second quality version of the content comprises:
downloading the second quality version of the content based on a furthest point in the content that has been played to the user.

10. The user device of claim 8, wherein the requesting the second quality version of the content comprises:
selecting the second quality version of the content to download based on crowdsourced data specifying a highest quality version of the content that is acceptable given playback capabilities of the user device.

11. The user device of claim 8, wherein the downloading the second quality version of the content comprises:
downloading the second quality version of the content based on a location of the user device.

12. The user device of claim 8, wherein the determining the second quality version of the content among the plurality of quality versions of the content to download comprises:
determining the second quality version of the content among the plurality of quality versions of the content to download based on an amount of time the user has to download the content.

13. The user device of claim 12, wherein the amount of time the user has set aside to playback the content is determined based on a calendar for the user.

14. The user device of claim 12, wherein the amount of time the user has set aside to playback the content is determined based on a location of the user device.

15. A non-transitory computer-readable medium having instructions stored thereon that, when executed by at least one computing device, cause the at least one computing device to perform operations comprising:
receiving a request for content from a user;
downloading a first quality version of the content from a content server in response to the receiving the request;
playing the first quality version of the content on the at least one computing device;
in response to the playing, determining a second quality version of the content among a plurality of quality versions of the content to download based on a future time slot when the user intends to playback the content, wherein a resolution of the second quality version of the content is lower than a resolution of the first quality version of the content;
in response to the determining, requesting the second quality version of the content;
downloading the second quality version of the content in response to the requesting the second quality version of the content;
discontinuing the downloading of the first quality version of the content based on the downloading of the second quality version of the content; and
playing the second quality version of the content on the at least one computing device at a point in the content where the downloading of the first quality version of the content was discontinued.

16. The non-transitory computer-readable medium of claim 15, wherein the downloading the second quality version of the content further comprises:
downloading the second quality version of the content based on a furthest point in the content that has been played to the user.

17. The non-transitory computer-readable medium of claim 15, wherein the requesting the second quality version of the content further comprises:
selecting the second quality version of the content to download based on crowdsourced data specifying a highest quality version of the content that is acceptable given playback capabilities of the at least one computing device.

18. The non-transitory computer-readable medium of claim 15, wherein the downloading the second quality version of the content further comprises:
downloading the second quality version of the content based on a location of the at least one computing device.

19. The non-transitory computer-readable medium of claim 15, wherein the determining the second quality version of the content among the plurality of quality versions of the content to download further comprises:
determining the second quality version of the content among the plurality of quality versions of the content to download based on an amount of time the user has to download the content.

20. The non-transitory computer-readable medium of claim 19, wherein the amount of time the user has set aside to playback the content is determined based on a calendar for the user or a location of the at least one computing device.

* * * * *